March 18, 1952     W. H. SEDBERRY     2,589,738

VARIABLE SELECTIVE AUTOMATIC CHOKE FOR SHOTGUNS

Filed Jan. 13, 1950     4 Sheets-Sheet 1

INVENTOR.
WILLIAM H. SEDBERRY
BY
McMorrow, Berman + Davidson
ATTORNEYS

March 18, 1952   W. H. SEDBERRY   2,589,738
VARIABLE SELECTIVE AUTOMATIC CHOKE FOR SHOTGUNS
Filed Jan. 13, 1950   4 Sheets-Sheet 2
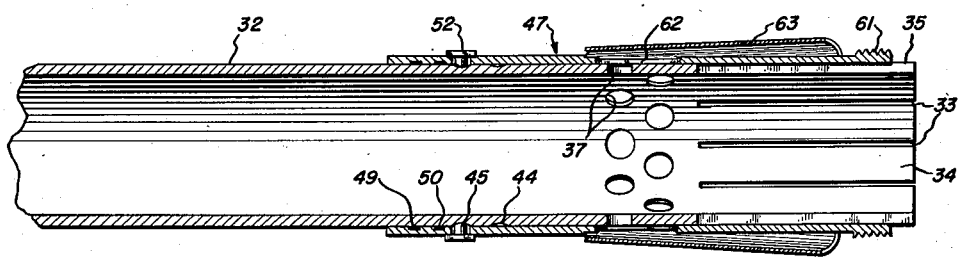
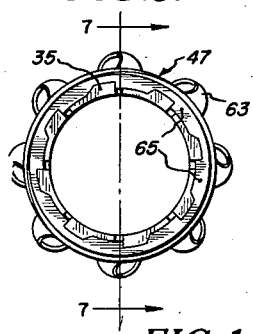
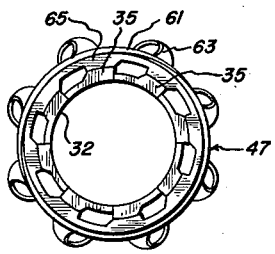
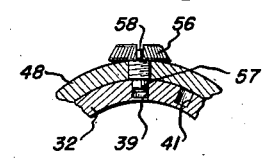
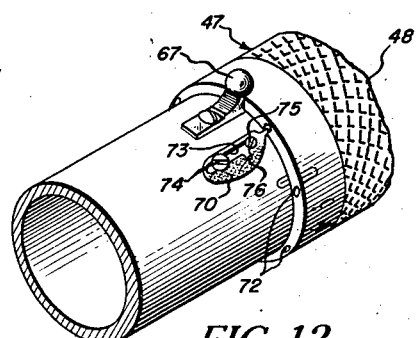
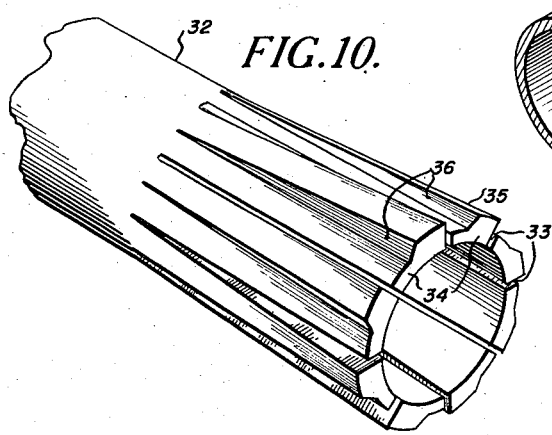
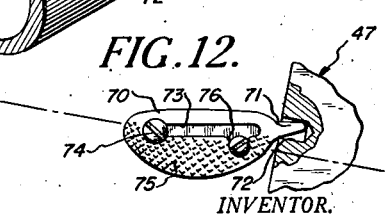
INVENTOR.
WILLIAM H. SEDBERRY
BY
McMorrow, Berman & Davidson
ATTORNEYS March 18, 1952 W. H. SEDBERRY 2,589,738
VARIABLE SELECTIVE AUTOMATIC CHOKE FOR SHOTGUNS
Filed Jan. 13, 1950 4 Sheets-Sheet 3

INVENTOR.
WILLIAM H. SEDBERRY
BY
McMorrow, Berman & Davidson
ATTORNEYS

March 18, 1952 W. H. SEDBERRY 2,589,738
VARIABLE SELECTIVE AUTOMATIC CHOKE FOR SHOTGUNS
Filed Jan. 13, 1950 4 Sheets-Sheet 4
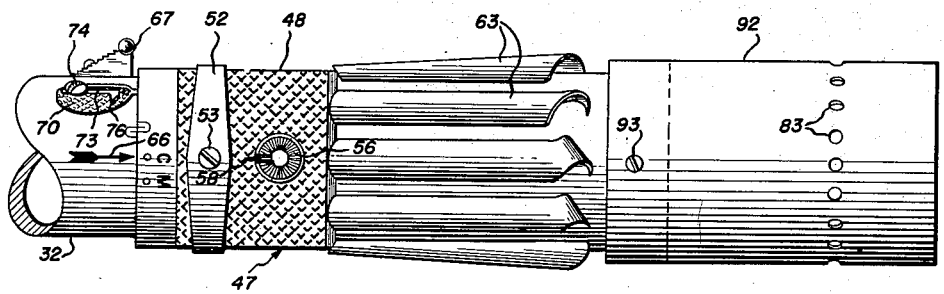
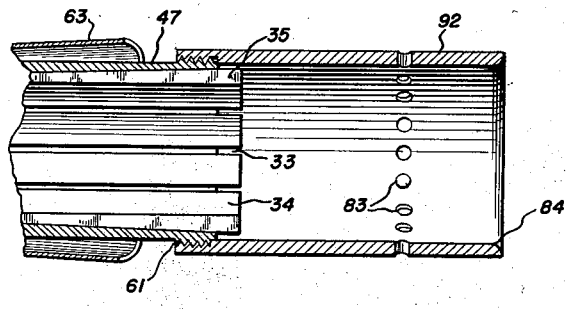
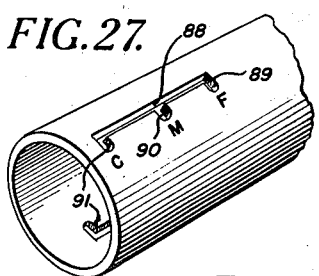
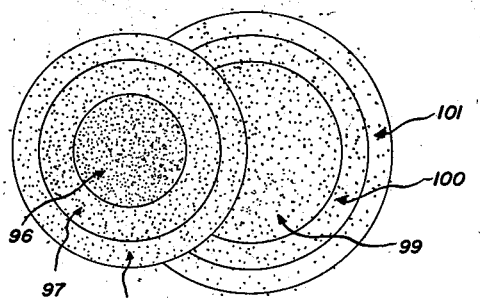
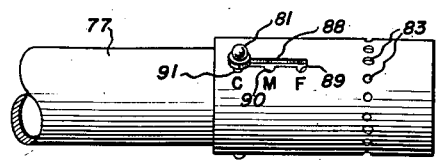
INVENTOR.
WILLIAM H. SEDBERRY
BY
McMorrow, Berman + Davidson
ATTORNEYS Patented Mar. 18, 1952

2,589,738

UNITED STATES PATENT OFFICE 2,589,738

VARIABLE SELECTIVE AUTOMATIC CHOKE FOR SHOTGUNS

William H. Sedberry, Thompsons Station, Tenn.

Application January 13, 1950, Serial No. 138,416

7 Claims. (Cl. 42—79)

This invention relates to variable choke devices for shotguns, and more particularly to an adjustable choke device for shotguns of the type wherein the device may be set to provide a cylinder choke for the first shot and wherein the device is automatically adjusted for a greater degree of choke for the next shot.

A main object of the invention is to provide a novel and improved adjustable choke device for shotguns, said device being very simple in construction, being easy to mount on a shotgun, and providing a number of degrees of choking action which may be readily selected as desired.

A further object of the invention is to provide an improved choke device of the type wherein the device may be set to provide non-choking action for the first shot and to automatically shift to a choking position for the second shot, said device being inexpensive to manufacture, involving only a few parts, and being readily applicable to a conventional gun barrel.

A still further object of the invention is to provide an improved choke device for shotguns of the type which may be set to shoot a certain pattern for the first shot and then a relatively choked pattern for the next shot, said relatively choked pattern being automatically obtained by the action of the device, the device being further arranged so that the device will reset to provide a relatively unchoked pattern for the third shot, or, if so desired, may be set to provide a choked pattern for all shots after the first shot.

A still further object of the invention is to provide an improved adjustable choke device for shotguns which may be set to shoot continuously any one of four different patterns or which may be set to provide a relatively unchoked pattern for the first shot and a modified, relatively choked pattern for the second shot, the choke device being automatically reset alternately after each shot to provide a different pattern.

A still further object of the invention is to provide an improved variable selective automatic choke device for shotguns having means whereby the barrel of a gun can have its outer part adjusted from a condition providing a cylinder pattern to a condition providing a modified choke pattern, or from a modified choke position to a full choke condition, the device functioning to change over from one condition to another automatically, said device being further provided with means so that it may be made non-automatic and may be set to provide continuously any one of four patterns.

A still further object of the invention is to provide a choke reforming attachment for a shotgun for unchoking or opening a shot pattern to provide improved control of the shot column, said reforming device being very simple in construction, being easy to install, being readily adjustable to provide different degrees of shot pattern reformation, and being very inexpensive to manufacture.

Further objects and advantages of the invention will become apparent from the following description and claims, and from the accompanying drawings, wherein:

Figure 7 is a fragmentary, enlarged, longitudinal, cross-sectional view taken through the muzzle portion of the barrel of the gun of Figure 1, said view being taken on line 7—7 of Figure 8;

Figure 8 is an end elevational view of the muzzle of the gun barrel, showing the choke device set to provide a cylinder pattern;

Figure 9 is a view similar to Figure 8, but showing the device set to provide a choke pattern;

Figure 10 is an enlarged, perspective view of the end of the barrel of the gun of Figures 1 and 2;

Figure 11 is a fragmentary, enlarged, perspective, detail view showing the locking means for controlling the action of the outer retaining sleeve of the choke device to provide a desired sequence of choke patterns;

Figure 12 is an enlarged detail view showing the latch device of Figure 11 engaged with the outer retaining sleeve of the choke device and set to lock the choke device after the first shot to provide a continuous, constant, choked pattern for succeeding shots;

Figure 13 is an enlarged, cross-sectional, detail view taken on line 13—13 of Figure 2;

Figure 23 is a view showing the gun barrel provided with the automatic choke device as in Figure 2, but provided in addition with a choke pattern reforming device made in accordance with the present invention;

Figure 24 is a fragmentary, longitudinal, cross-sectional view taken through the forward end of the gun barrel and the pattern reforming device of Figure 23;

Figure 25 is a diagrammatic illustration of the various shot patterns obtainable by the use of the automatic choke device and reforming sleeve member of the present invention;

Figure 26 is a side elevational view, partly in cross-section, of a thread protecting ring member which is employed to protect the threads provided on the outer retaining sleeve of the automatic choke device of the present invention, said threads being provided to receive the reforming sleeve member;

Figure 27 is a fragmentary, perspective view of the rear portion of a modified form of reforming sleeve member constructed in accordance with the present invention;

Figure 28 is an elevational view of the end of a gun barrel showing the modified reforming sleeve of Figure 27 mounted on the barrel.

Figure 3:
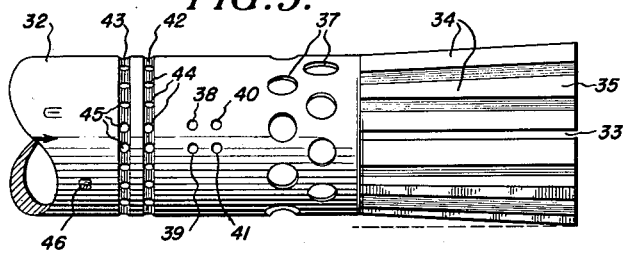
Figure 3 is an enlarged elevational detail view of the forward end of the barrel of the gun of Figures 1 and 2 with the outer sleeve member of the choke device removed.
Figure 4:
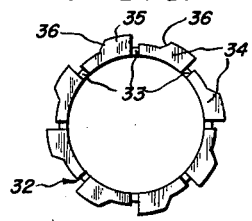
Figure 4 is an end elevational view of the muzzle end of the gun barrel of Figure 3.

Referring to the drawings, 31 designates a shotgun having a barrel 32. As shown in Figures 3 and 4, the muzzle end of the barrel 32 is formed with evenly spaced, longitudinal, open-ended slots 33 defining the regularly spaced, resilient fingers 34 extending around the circumference of the muzzle end of said barrel. Each finger is formed with a tapered rib 35, the rib diminishing in height rearwardly from the free end of the finger, and the respective ribs being located at corresponding side marginal portions of the respective fingers and being approximately one-half the width of the fingers. Each rib has a cam-like, inclined, side surface 36 merging with the intermediate portion of the associated finger 34, said side surface being inclined at an angle of approximately 45° to the surface of the finger at its intersection therewith.

Rearwardly adjacent the fingers 34 the barrel 32 is formed with two annular rows of openings 37, the openings being staggered, as shown in Figure 3. Rearwardly of the openings 37 the barrel is formed with four recesses 38, 39, 40 and 41 arranged in a rectangular pattern, as shown in Figure 3. Rearwardly of these recesses, the barrel is formed with a holding means in the form of the spaced annular grooves 42 and 43. Groove 42 is formed with regularly spaced recesses 44 and groove 43 is similarly formed with regularly spaced recesses 45 longitudinally aligned with the recesses 44. Rearwardly adjacent the groove 43, the barrel is formed with a tapped opening into which a stud 46 is threaded.

Figure 5:
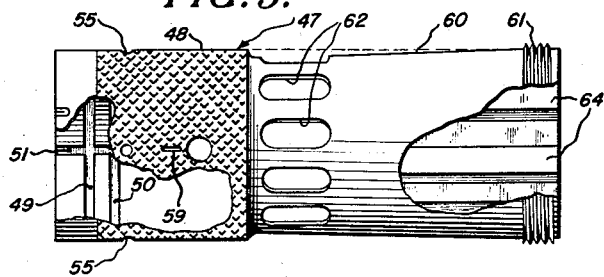
Figure 5 is a side elevational view, partly broken away, of the outer retaining sleeve member of the automatic choke device.

Designated at 47 is a sleeve member fitting rotatably on the barrel 32 and having a cylindrical, rear, knurled portion 48 which is formed internally with a first means in the form of spaced, annular grooves 49 and 50 separated by the same spacing as that between grooves 42 and 43 each of the grooves 49 and 50 being slidably engageable with the stud 46 for guiding the sleeve 47 in its rotational movement and holding the sleeve against sliding axial movement. The internal wall of portion 48 is formed with a second means in the form of longitudinal groove 51 which intersects the annular grooves 49 and 50 and which extends to the rear edge of sleeve member 47, as shown in Figure 5 the groove 51 being slidably engageable with the stud 46 for guiding the sleeve 47 in its sliding axial movement and holding the sleeve against rotational movement. The sleeve member is positioned on the barrel with the stud 46 engaged in either of the annular, internal grooves 49 or 50 of said sleeve member. When thus engaged, the sleeve member may rotate on the barrel, but is held against axial movement thereon. To change the axial position of the sleeve member, said sleeve member is manually rotated until the groove 51 is in registry with stud 46, whereby said sleeve member may be moved axially from a position wherein stud 46 engages in one of the annular grooves 49 or 50 to a position wherein said stud may engage in the other annular groove.

Figure 14:
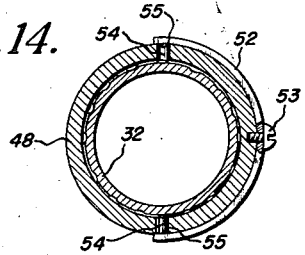
Figure 14 is a cross-sectional, detail view taken on line 14—14 of Figure 2.

Designated at 52 is a resilient semicircular yoke member which straddles the knurled portion 48 of the sleeve member and is secured thereto at its center portion by a screw 53, as shown in Figure 14. At its ends the yoke member carries detent means or inwardly projecting, radial pins 54, 54 which extend through openings 55 in said knurled portion and interengage with either the recesses 45 of the groove 43 or the recesses 44 of the groove 42, depending upon the position of axial adjustment of the sleeve member 47 on the barrel 32.

Designated at 56 is a locking element or screw threaded through the wall of the knurled portion 48 and having a reduced tip 57 which may be selectively engaged in any one of spaced receiving means or the recesses 38, 39, 40 or 41 to lock the sleeve member 47 in any one of four different positions on the barrel 32. The head of screw 56 is provided with a depending spring detent 58 which is engageable in a recess 59 in the knurled portion 48 to lock the screw against undesired rotation. The screw 56 may therefore be locked in a position wherein tip 57 engages in one of the recesses 38, 39, 40 or 41, or may be locked in a position wherein said tip is entirely withdrawn from engagement with the barrel 32.

Figure 1:
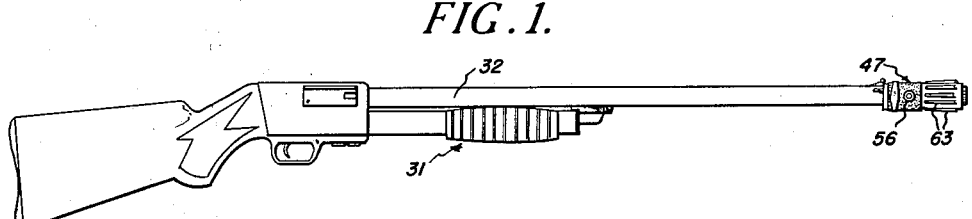
Figure 1 is a side elevational view of an improved automatic choke device constructed according to the present invention shown mounted on a shotgun of the pump gun type.
Figure 2:
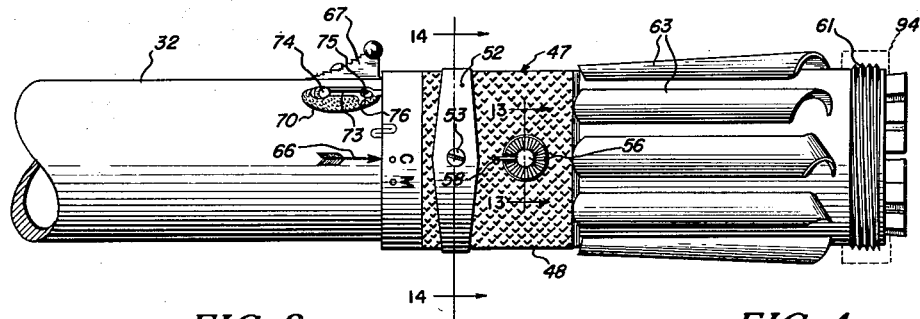
Figure 2 is an enlarged elevational view of the forward end of the barrel of the gun of Figure 1, showing the automatic choke device mounted thereon.

The forward portion of the sleeve member 47 flares forwardly, as shown at 60, and is provided adjacent its forward end with external screw threads 61. Adjacent the knurled portion 48, the sleeve member is formed with equally spaced apertures or slots 62 through which gases from the barrel 32 may pass, said gases emerging from the barrel at the openings 37 which underlie the slots 62. Secured on the forwardly flaring portion 60 of the sleeve member are the longitudinally extending, curved vanes 63, the rear portion of each vane overlying one of the slots 62 and the forward portion thereof curving inwardly, as shown in Figures 2 and 23. The vanes are arranged so that the gases discharging from the slots 62 apply a clockwise torque shortly after the firing of a shot on the sleeve member 47, as viewed in Figure 8, when they reach the inwardly curved forward ends of the vanes.

Figure 6:
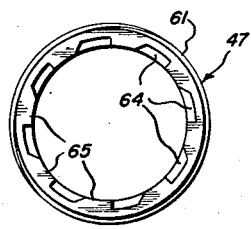
Figure 6 is an end elevational view of the sleeve device of Figure 5.

As shown in Figures 5 and 6, the interior wall of the sleeve member is formed with longitudinal grooves 64 conforming in shape with the ribs 35 of the barrel fingers 34, the grooves 64 defining therebetween longitudinal ribs 65 similar in shape to said ribs 35. When the sleeve member 47 is arranged with the ribs 65 received between the respective adjacent ribs 35 of the barrel fingers, said fingers are in a relatively spread position, as shown in Figure 8. When the sleeve member 47 rotates clockwise, as viewed in Figure 8, for example, as a result of a shot being fired, the ribs 65 ride up the camming surfaces 36 onto the ribs 35 and flex the fingers 34 inwardly to the positions shown in Figure 9. This provides a choking action at the gun muzzle for the next shot. The next shot will again cause the discharging gases to exert a clockwise torque on sleeve member 47 at the vanes 63. This torque will again produce clockwise rotation of the sleeve member, moving the ribs 65 into positions between successive ribs 35, thereby releasing the fingers 34 and allowing said fingers to spread to the positions of Figure 8, whereby the gun muzzle is unchoked for the next shot.

The minimum degree of choking effect is obtained when the sleeve member 47 is arranged so that the stud 46 is located in the groove 50 and the ribs 65 are positioned between adjacent ribs 35, as in Figure 8. A modified choking effect is obtained when the sleeve member is rotated to the position of Figure 9. A further modified choking effect is obtained when the sleeve member 47 is arranged so that stud 46 is located in the groove 49 with the ribs 65 positioned between adjacent ribs 35, inasmuch as sleeve member 47 flexes the fingers 34 inwardly when it is moved forwardly on the barrel to engage stud 46 in groove 49. Full choking effect is obtained when, with the stud 46 in groove 49, the sleeve member is rotated to the position of Figure 9, whereby the fingers 34 are flexed inwardly to a maximum degree.

The sleeve member 47 may be locked in any one of the four above-described positions, providing either no choking action, modified choking action, further modified choking action, or full choking action, by engaging the tip of the locking screw 56 in either recess 39, 38, 41 or 49.

The spring locking member 52 is yieldable to allow the sleeve member 47 to be manually adjusted on the barrel 32. With the screw 56 in a retracted position, such adjustment may be therefore readily made. When the stud 46 is engaged in groove 50, the locking pins 55 engage in the positioning recesses 44 of the groove 42, and insure correct relative rotational positioning of the camming ribs 65 and 35 during either manual setting of the sleeve member or automatic setting thereof, as a result of firing the gun. Similarly, when the stud 46 is engaged in groove 49, the locking pins 55 engage in the positioning recesses 45 of groove 43.

As shown in Figure 2, the barrel 32 is provided with a longitudinal index mark 66 and the sleeve member is provided with markings "C" and "M" registrable with the index mark 66 and indicating either a "choke" or a "modified" adjustment of the sleeve member.

Secured to the barrel rearwardly adjacent the sleeve member 47 is a conventional sight 67.

Designated at 70 is a locking member formed with a tapered forward tip 71 loosely engageable in locking recesses 72 formed in the rear edge of the sleeve member 47, said locking recesses being spaced apart by the same angles as the ribs 65. Member 70 is formed with a longitudinal slot 73 through which extend the headed screws 74 and 75 holding the member 70 secured to the barrel. The distance between the screws 74 and 75 is less than the length of the slot 73 by a value greater than the length of tip 71, so that the member 70 may be moved rearwardly out of engagement with the rear edge of the sleeve member 47, as shown in Figure 11. The slot 73 is formed with a right-angled branch 76 spaced from the rear end of the slot by the same distance as the spacing between screws 74 and 75, the arrangement being such that when the tip 71 is engaged in a recess 72, the screw 74 is in the rear end of the slot 73 and the member 70 may rotate counterclockwise, as viewed in Figure 12, responsive to the movement of the sleeve member 47 from its initial non-choking position to a choking position after the first shot. Figure 12 shows the sleeve member 47 moved to said choking position. It will be seen from Figure 12 that the member 70 has been rotated to engage screw 75 in the right-angled branch 76 and that the member 70 is held against further counterclockwise rotation. Therefore, with the member 70 arranged as in Figure 12, the second shot and all subsequent shots will be choked, since the sleeve member 47 is held against further rotation by the locking tip 71 of the member 70.

The member 70 may be placed in an inoperative position by moving it rearwardly to the position shown in Figures 2 and 11. The screw 74 is preferably provided with a spring locking washer which causes member 70 to remain in a given position of adjustment thereof and yet allows member 70 to be moved by thumb pressure.

From the foregoing description, it will be apparent that the sleeve member 47 may be set by means of the locking screw 56 to provide any one of four different constant short patterns. With the locking screw 56 disengaged from the barrel 32, the sleeve member 47 may be set either in a first position, wherein stud 46 is located in groove 50 to automatically provide a cylinder pattern on the first shot, a modified choke pattern on the second shot, and alternating cylinder and modified choke patterns on successive shots. With the stud 46 located in groove 49, the sleeve member automatically provides a modified choke pattern on the first shot, a full choke pattern on the second shot, and alternating modified choke and full choke patterns on successive shots. With the stud 46 located in groove 50, the locking member 70 may be set to provide a cylinder pattern on the first shot and constant modified choke patterns on all successive shots.

The structure above described may be manufactured separately and arranged to be threaded onto the barrel of a conventional gun instead of being made unitary with the gun barrel within the contemplation of the present invention.

Figure 15:
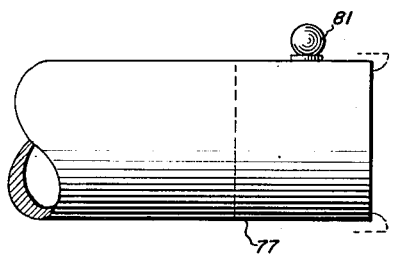
Figure 15 is an enlarged, elevational, detail view of the muzzle end of a normal shotgun barrel.
Figure 16:
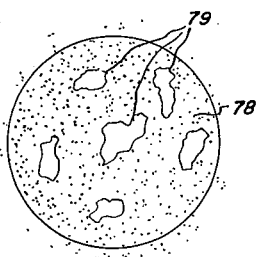
Figure 16 is a cross-sectional view showing the type of shot pattern obtained from a gun of normal construction, such as shown in Figure 15.

Referring to Figures 15 and 16, 77 designates the muzzle end of a conventional shotgun barrel and 78 designates the cross-sectional appearance of the normal shot pattern obtained therefrom. It will be seen that the normal shot pattern contains numerous open areas 79 and shows numerous random shots around the circumference of the pattern, indicating poor control of the directivity of the shot. This effect may be corrected by the use of a shot reforming sleeve, such as shown at 80 in Figures 18 and 19. The sleeve 80 slips over the muzzle end 77 and may be secured on said muzzle end in any one of three different positions. The sight bolt, shown at 81, is employed in the manner shown in Figures 19 and 20, together with additional securing screws 82, 82 to fasten the reforming sleeve 80 to the muzzle end.

Figure 17:
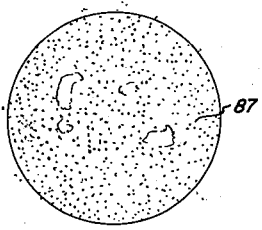
Figure 17 is a cross-sectional view of a shot pattern obtained when my improved shot pattern reforming device is employed with the gun barrel of Figure 15, the reforming device being set to provide a modified cylinder effect.
Figure 18:
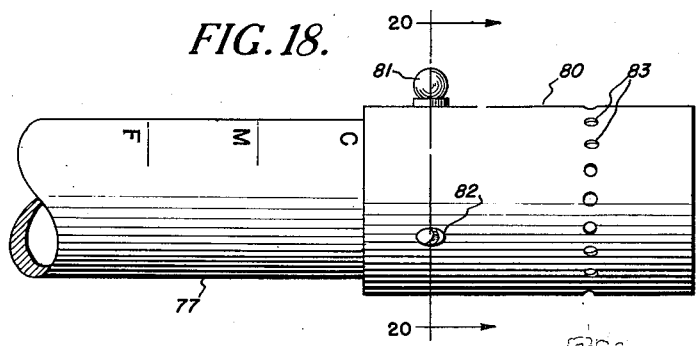
Figure 18 is an elevational view of the end of the gun barrel of Figure 15 provided with a shot pattern reforming member according to the present invention, said pattern reforming member being set to provide a maximum degree of control over the shot issuing from the gun barrel.
Figure 19:
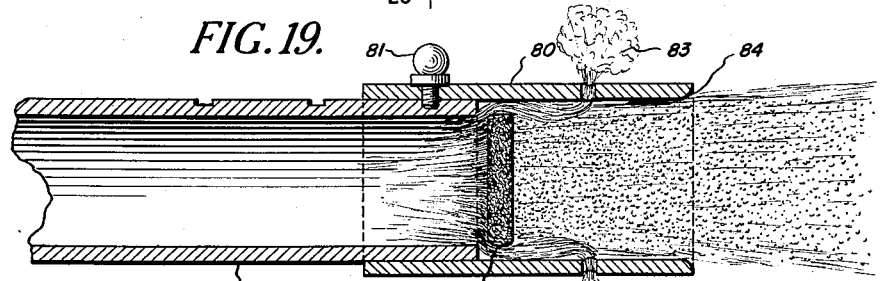
Figure 19 is a longitudinal, cross-sectional view taken through the gun barrel and shot pattern reforming device of Figure 18.
Figure 20:
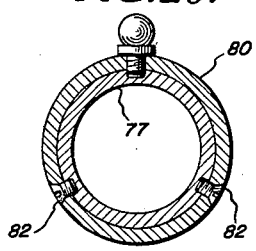
Figure 20 is a cross-sectional view taken on line 20—20 of Figure 18.
Figure 21:
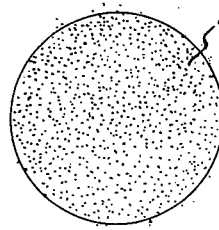
Figure 21 is a cross-sectional view showing the shot pattern obtained by employing the arrangement of Figures 18 and 19.
Figure 22:
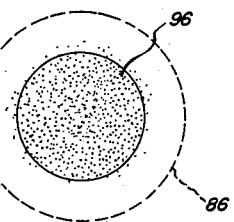
Figure 22 is a view showing a standard full choke shot pattern as compared in size with the shot pattern of Figure 21.

Reforming sleeve 80 is formed with one or more circumferential rows of gas discharge openings 83 at its forward portion and is rounded off at its front rim, as shown at 84. When the sleeve 80 is set to provide a full reforming effect, as shown in Figures 18 and 19, the propelling gases flow past the shot propelling wad 85 as said wad leaves the muzzle end and the gases flow partially through openings 83, meanwhile providing a gathering effect on the shot which establishes a more homogeneous cylinder pattern, shown at 86 in Figure 21, than the normal cylinder pattern 78. By setting the sleeve 80 at an intermediate position of adjustment, for example, at the index mark "M" in Figure 18, a cylinder pattern 87, shown in Figure 17, is obtained, which is also substantially more homogeneous than the normal cylinder pattern 78. By setting sleeve 80 at index mark "F" in Figure 18, the sleeve has minimum reforming effect and substantially the normal scattered cylinder pattern 78 is obtained.

As shown in Figures 27 and 28, the pattern reforming sleeve may be formed with opposing, longitudinal slots 88 having notches 89, 90 and 91. The sleeve of Figures 27 and 28 may be secured on the muzzle end of a shotgun barrel by suitable securing screws engaged through the slots 88, the desired position of adjustment of the sleeve being established by setting the sleeve so that the securing screws are located either in the notches 91, 90 or 89, providing full reforming effect, modified reforming effect or minimum reforming effect, respectively. As shown in Figure 23, the sight bolt 81 may be employed as one of the securing screws.

Referring now to Figures 23 and 24, 92 designates a pattern reforming sleeve similar in construction to the sleeve 80 of Figures 18 and 19, but provided with internal screw threads at its rear end which are engageable with the external screw threads 61 of the choke sleeve 47. The pattern reforming sleeve 92 is mounted on the choke sleeve 47 in the manner shown in Figures 23 and 24 and may be locked in position by a set screw 93, as shown in Figure 23.

When the pattern reforming sleeve 92 is not used with choke sleeve 47, an internally threaded, knurled, annular ring 94 is engaged on the threads 61 to protect said threads against injury. Said ring is provided with a set screw 95 to secure it on the threads 61.

Referring now to Figure 25, 96 designates the cross-sectional shot pattern obtained when the sleeve 47 is set for full choke effect, without using the choke reforming sleeve 92. Designated at 97 is one of the modified choke patterns obtained by the use of sleeve 47, again without using the reforming sleeve 92. Designated at 98 is the cylinder pattern obtained when the sleeve 47 is set in non-choking position. Designated at 99 is a pattern obtained when the reforming sleeve 92 is employed with the sleeve 47, the sleeve 47 being set in maximum choking position. Designated at 100 is a pattern obtained when the reforming sleeve 92 is employed on sleeve 47, sleeve 47 being set to a modified choke position. Designated at 101 is a novel, very wide shot pattern obtained when the reforming sleeve 92 is employed on sleeve 47 with sleeve 47 set in its non-choking position. The wide pattern 101 is very desirable for shooting in dense cover, where game must be shot at a very close distance.

From the foregoing, it will be apparent that the pattern reforming sleeve will provide several additional shot patterns beyond those obtainable from the use of the automatic choke device.

While certain specific embodiments of a variable selective automatic choke device and pattern reforming means for a shotgun have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a shotgun, a barrel having the muzzle end thereof provided with a plurality of spaced slots extending longitudinally inwardly from said muzzle end and completely through the barrel, the portions of the barrel intermediate adjacent slots forming longitudinal spaced resilient fingers, a rib on the exterior face of each finger positioned adjacent one side edge thereof and spaced from the other side edge thereof and extending longitudinally of said finger, there being a plurality of spaced apertures in said barrel arranged longitudinally thereof and inwardly of said fingers, a sleeve positioned on said barrel inwardly of said slots and mounted on said barrel for sliding axial and rotational movement, said sleeve having a plurality of apertures arranged in spaced relation thereabout intermediate its ends, the apertures in said sleeve being in registry with the apertures in said barrel, and a plurality of spaced ribs on the interior face of said sleeve extending longitudinally of and inwardly from one end of said sleeve, each rib on said sleeve being interposed between a rib on one finger and a rib on the next adjacent finger and engageable with the rib on said one finger upon rotative movement of said sleeve to flex the fingers toward each other.

2. In a shotgun, a barrel having the muzzle end thereof provided with a plurality of spaced slots extending longitudinally inwardly from said muzzle end and completely through the barrel, the portions of the barrel intermediate adjacent slots forming longitudinal spaced resilient fingers, a rib on the exterior face of each finger positioned adjacent one side edge thereof and spaced from the other side edge thereof and extending longitudinally of said fingers, a stud projecting exteriorly of said barrel and spaced inwardly of said slots, there being a plurality of spaced apertures in said barrel arranged longitudinally thereof and inwardly of said fingers, a sleeve positioned on said barrel inwardly of said slots and mounted on said barrel for sliding axial and rotational movement, means on the inner face of said sleeve and slidably engageable with said stud for guiding the sleeve in its rotational movement and holding the sleeve against sliding axial movement, a second means on the inner face of said sleeve adjacent to and in communication with said first means and slidably engageable with said stud for guiding said sleeve in its sliding axial movement and holding said sleeve against rotational movement, said sleeve having a plurality of apertures arranged in spaced relation thereabout intermediate its ends, the apertures in said sleeve being in registry with the apertures in said barrel, and a plurality of spaced ribs on the interior face of said sleeve extending longitudinally of and inwardly from one end of said sleeve, each rib on said sleeve being interposed between a rib on one finger and a rib on the next adjacent finger and engageable with the rib on said one finger upon rotative movement of said sleeve to flex the fingers toward each other.

3. In a shotgun, a barrel having the muzzle end thereof provided with a plurality of spaced slots extending longitudinally inwardly from said muzzle end and completely through the barrel, the portions of the barrel intermediate adjacent slots forming longitudinal spaced resilient fingers, a rib on the exterior face of each finger positioned adjacent one side edge thereof and spaced from the other side edge thereof and extending longitudinally of said fingers, a stud projecting exteriorly of said barrel and spaced inwardly of said slots, there being a plurality of spaced apertures in said barrel arranged longitudinally thereof and inwardly of said fingers, a sleeve positioned on said barrel inwardly of said slots and mounted on said barrel for sliding axial and rotational movement, means on the inner face of said sleeve and slidably engageable with said stud for guiding the sleeve in its rotational movement and holding the sleeve against sliding axial movement, a second means on the inner face of said sleeve adjacent to and in communication with said first means and slidably engageable with said stud for guiding said sleeve in its sliding axial movement and holding said sleeve against rotational movement, a resilient yoke fixed on said sleeve intermediate its ends, detent means carried by said yoke extending through said sleeve and interengaging with a holding means on the inner face of said barrel for securing said sleeve in a selected position of its rotational movement, said sleeve having a plurality of apertures arranged in spaced relation thereabout intermediate its ends, the apertures in said sleeve being in registry with the apertures in said barrel, and a plurality of spaced ribs on the interior face of said sleeve extending longitudinally of and inwardly from one end of said sleeve, each rib on said sleeve being interposed between a rib on one finger and a rib on the next adjacent finger and engageable with the rib on said one finger upon rotative movement of said sleeve to flex the fingers toward each other.

4. In a shotgun, a barrel having the muzzle end thereof provided with a plurality of spaced slots extending longitudinally inwardly from said muzzle end and completely through the barrel, the portions of the barrel intermediate adjacent slots forming longitudinal spaced resilient fingers, a rib on the exterior face of each finger positioned adjacent one side edge thereof and spaced from the other side edge thereof and extending longitudinally of said fingers, a stud projecting exteriorly of said barrel and spaced inwardly of said slots, there being a plurality of spaced apertures in said barrel arranged longitudinally thereof and inwardly of said fingers, a sleeve positioned on said barrel inwardly of said slots and mounted on said barrel for sliding axial and rotational movement, means embodying at least a pair of spaced annular grooves on the inner face of said sleeve and slidably engageable with said stud for guiding the sleeve in its rotational movement and holding the sleeve against sliding axial movement, a second means embodying a longitudinal groove on the inner face of said sleeve and intersecting said pair of annular grooves and slidably engageable with said stud for guiding said sleeve in its sliding axial movement and holding said sleeve against rotational movement, said sleeve having a plurality of apertures arranged in spaced relation thereabout intermediate its ends, the apertures in said sleeve being in registry with the apertures in said barrel, and a plurality of spaced ribs on the interior face of said sleeve extending longitudinally of and inwardly from one end of said sleeve, each rib on said sleeve being interposed between a rib on one finger and a rib on the next adjacent finger and engageable with the rib on said one finger upon rotative movement of said sleeve to flex the fingers toward each other.

5. In a shotgun, a barrel having the muzzle end thereof provided with a plurality of spaced slots extending longitudinally inwardly from said muzzle end and completely through the barrel, the portions of the barrel intermediate adjacent slots forming longitudinal spaced resilient fingers, a rib on the exterior face of each finger positioned adjacent one side edge thereof and spaced from the other side edge thereof and extending longitudinally of said fingers, a stud projecting exteriorly of said barrel and spaced inwardly of said slots, there being a plurality of spaced apertures in said barrel arranged longitudinally thereof and inwardly of said fingers, a sleeve positioned on said barrel inwardly of said slots and mounted on said barrel for sliding axial and rotational movement, means embodying at least a pair of spaced annular grooves on the inner face of said sleeve and slidably engageable with said stud for guiding the sleeve in its rotational movement and holding the sleeve against sliding axial movement, a second means embodying a longitudinal groove on the inner face of said sleeve and intersecting said pair of annular grooves and slidably engageable with said stud for guiding said sleeve in its sliding axial movement and holding said sleeve against rotational movement, said sleeve having a plurality of apertures arranged in spaced relation thereabout intermediate its ends, the apertures in said sleeve being in registry with the apertures in said barrel, a plurality of spaced ribs on the interior face of said sleeve extending longitudinally of and inwardly from one end of said sleeve, each rib on said sleeve being interposed between a rib on one finger and a rib on the next adjacent finger and engageable with the rib on said one finger upon rotative movement of said sleeve to flex the fingers toward each other, and a plurality of spaced vanes extending longitudinally inwardly from said one end of said sleeve and having one end overlying an adjacent one of the apertures in said sleeve.

6. In a shotgun, a barrel having the muzzle end thereof provided with a plurality of spaced slots extending longitudinally inwardly from said muzzle end completely through the barrel, the portions of the barrel intermediate adjacent slots forming longitudinal spaced resilient fingers, a rib on the exterior face of each finger positioned adjacent one side edge thereof and spaced from the other side edge thereof and extending longitudinally of said fingers, there being a plurality of spaced apertures in said barrel arranged longitudinally thereof and inwardly of said fingers, a sleeve positioned on said barrel inwardly of said slots and mounted on said barrel for sliding axial and rotational movement, said sleeve having a plurality of apertures arranged in spaced relation thereabout intermediate its ends, the apertures in said sleeve being in registry with the apertures in said barrel, a plurality of spaced ribs on the interior face of said sleeve extending longitudinally of and inwardly from one end of said sleeve, each rib on said sleeve being interposed between a rib on one finger and a rib on the next adjacent finger and engageable with the rib on said one finger upon rotative movement of said sleeve to flex the fingers toward each other, and a locking element carried by said sleeve and selectively engageable with one of a plurality of spaced receiving means formed in said barrel to lock said sleeve in a selected position on said barrel.

7. In a shotgun, a barrel having the muzzle end thereof provided with a plurality of spaced slots extending longitudinally inwardly from said muzzle end and completely through the barrel, the portions of the barrel intermediate adjacent slots forming longitudinal spaced resilient fingers, a rib on the exterior face of each finger positioned adjacent one side edge thereof and spaced from the other side edge thereof and extending longitudinally of said fingers, there being a plurality of spaced apertures in said barrel arranged longitudinally thereof and inwardly of said fingers, the sleeve positioned on said barrel inwardly of said slots and mounted on said barrel for sliding axial and rotational movement, a resilient yoke fixed on said sleeve intermediate its ends, detent means carried by said yoke extending through said sleeve and interengaging with adjacent recesses of a plurality of spaced recesses arranged about and formed in each of a pair of longitudinally spaced annular grooves formed on the inner face of said barrel for securing said sleeve in a selected position of its rotational movement, said sleeve having a plurality of apertures arranged in spaced relation thereabout intermediate its ends, the apertures in said sleeve being in registry with the apertures in said barrel, and a plurality of spaced ribs on the interior face of said sleeve extending longitudinally of and inwardly from one end of said sleeve, each rib on said sleeve being interposed between a rib on one finger and a rib on the next adjacent finger and engageable with a rib on said one finger upon rotative movement of said sleeve to flex the fingers toward each other.

WILLIAM H. SEDBERRY.

REFERENCES CITED

The following references are of record in the file of this patent:

UNITED STATES PATENTS

| Number | Name | Date |
| --- | --- | --- |
| 2,417,721 | Whedon | Mar. 18, 1947 |
| 2,451,514 | Sieg | Oct. 19, 1948 |
| 2,453,747 | Egleson | Nov. 16, 1948 |
| 2,476,438 | Wright | July 19, 1949 |
| 2,490,829 | Noll | Dec. 13, 1949 |
| 2,499,428 | Tiffany | Mar. 7, 1950 |